(12) United States Patent
Feeney et al.

(10) Patent No.: US 8,533,163 B2
(45) Date of Patent: *Sep. 10, 2013

(54) DATABASE OFFLOAD PROCESSING

(75) Inventors: Martin J. Feeney, San Diego, CA (US);
Ofer Michael, Newton, MA (US);
Ronald G. Haupert, Circle Pines, MN (US); Douglas E. Lecrone, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1442 days.

This patent is subject to a terminal disclaimer.

(21) Appl. No.: 11/473,617

(22) Filed: Jun. 23, 2006

(65) Prior Publication Data

US 2007/0299883 A1 Dec. 27, 2007

(51) Int. Cl.
*G06F 7/00* (2006.01)
(52) U.S. Cl.
USPC ........... 707/674; 707/640; 707/821; 707/649; 709/227; 711/140
(58) Field of Classification Search
USPC ................. 707/674, 640, 649, 821; 709/227; 711/140
See application file for complete search history.

(56) References Cited

U.S. PATENT DOCUMENTS

| | | |
|---|---|---|
| 5,206,939 A | 4/1993 | Yanai |
| 5,495,601 A | 2/1996 | Narang et al. |
| 5,778,394 A | 7/1998 | Galtzur |
| 5,845,147 A | 12/1998 | Vishlitzky |
| 5,857,208 A | 1/1999 | Ofek |
| 2002/0040398 A1* | 4/2002 | Nguyen ........................ 709/227 |
| 2005/0160090 A1* | 7/2005 | Harjanto ............................ 707/3 |
| 2005/0256999 A1* | 11/2005 | Kishi et al. ..................... 711/111 |
| 2007/0005564 A1* | 1/2007 | Zehner .............................. 707/2 |

OTHER PUBLICATIONS

"The New IBM System z9™," IBM System z announcement, http://www-03.ibm.com/systems/z/feature042706/index.html, Oct. 2006.
Vizard, Michael, "IBM Previews DB2 Running on Storage Array," CRN Breaking News, www.crn.com/sections/breakingnews/breakingnews.jhtml, Jul. 26, 2005.
Amdahl Corporation, Current and Future DASD Considerations for DB2 Implementation, Oct. 2006.

* cited by examiner

*Primary Examiner* — Tony Mahmoudi
*Assistant Examiner* — Tuan-Khanh Phan
(74) *Attorney, Agent, or Firm* — Muirhead and Saturnelli, LLC

(57) ABSTRACT

Handling a database request includes providing a first database manager on a storage device containing data for the database, generating the database request external to the storage device, providing the database request to the first database manager on the storage device, and the first database manager servicing the database request by obtaining data internally from the storage device and processing the data within the storage device to provide a result thereof, wherein portions of the data that are not part of the result are not provided externally from the storage device. Handling a database request may also include providing a host having a database application running thereon. The database request may be generated by the database application. Handling a database request may also include providing a second database manager on the host, where the second database manager communicates with the first database manager to provide the database request.

19 Claims, 10 Drawing Sheets

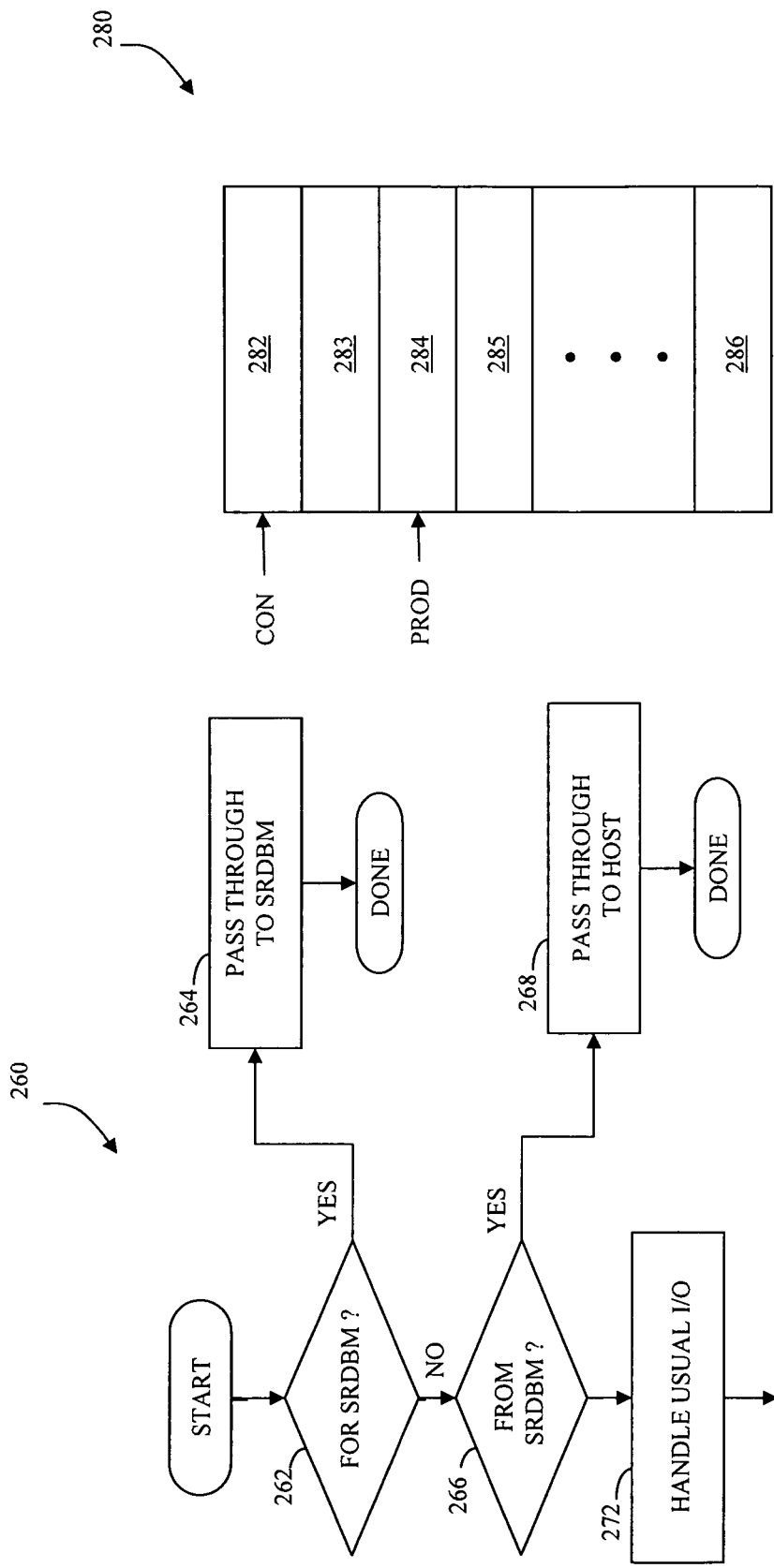

DATABASE OFFLOAD PROCESSING

BACKGROUND OF THE INVENTION

1. Technical Field

This application relates to computer storage devices, and more particularly to the field of efficiently using computer storage devices to perform data operations.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

Some applications, such as database applications, cause the host to perform a significant number of accesses to the storage device. In addition, applications like database applications cause a significant amount of data to be exchanged between the host and a storage device, thus using data bandwidth that could be used for other purposes, including improving the throughput of other applications. Accordingly, it is desirable to provide a mechanism that allows database operations to be performed on the storage device to eliminate or reduce the significant amount of accesses and data transfers between the storage device and the host. It would also be desirable in some circumstances to be able to shift CPU cycles associated with database operations from the processor(s) of the host to the processor(s) of the storage device.

SUMMARY OF THE INVENTION

According to the present invention, handling a database request includes providing a first database manager on a storage device containing data for the database, generating the database request external to the storage device, providing the database request to the first database manager on the storage device, and the first database manager servicing the database request by obtaining data internally from the storage device and processing the data within the storage device to provide a result thereof, wherein portions of the data that are not part of the result are not provided externally from the storage device. The first database manager may use the Linux operating system. Handling a database request may also include providing a host having a database application running thereon. The database request may be generated by the database application. Handling a database request may also include providing a second database manager on the host, where the second database manager communicates with the first database manager to provide the database request. The first database manager may be a relational database manager. Handling a database request may also include providing a second database manager that communicates with the first database manager to provide the database request, wherein the second database manager is external to the storage device. The first database manager may communicate with the second database manager using the DRDA protocol. Shared memory of the storage device may be used to obtain data internally. The shared memory may include a plurality of queues that are used to obtain data internally. At least one of the queues may be implemented using an array.

According further to the present invention, computer software, in a computer-readable storage medium within a storage device, handles database requests for data stored on the storage device. The computer software includes executable code within the storage device that receives the database requests from a source external to the storage device and executable code within the storage device that services the database requests by obtaining data internally from the storage device and processing the data within the storage device to provide a result thereof, wherein portions of the data that are not part of the result are not provided externally from the storage device. The executable code may run using the Linux operating system. The executable code that services the database request may be a relational database manager. Shared memory of the storage device may be used to obtain data internally. The shared memory may include a plurality of queues that are used to obtain data internally.

According further to the present invention, a storage device includes a plurality of directors that handle receiving and sending data for the storage device and at least one processor system, in communication with at least one of the directors, where the at least one processor system includes a computer-readable storage medium that handles database requests for data stored on the storage device, the computer-readable storage medium including executable code within the storage device that receives the database requests from a source external to the storage device and executable code within the storage device that services the database requests by obtaining data internally from the storage device and processing the data within the storage device to provide a result thereof, wherein portions of the data that are not part of the result are not provided externally from the storage device. The executable code that services the database request may be a relational database manager. The storage device may include shared memory that is used to obtain data internally. The shared memory may include a plurality of queues that are used to obtain data internally.

According further to the present invention, offloading application processing from a host processor system includes providing a first part of the application on the host processor system, providing a second part of the application on a storage device containing data for the application, the first part of the application communicating with the second part of the application to generate requests from the first part of the application to the second part of the application, and the second part of the application servicing the requests by obtaining data internally from the storage device and processing the data within the storage device to obtain a result thereof that is provided from the second part of the application to the first part of the application, where portions of the data that are not part of the result are not provided. The second part of the application may be run using the Linux operating system. Shared memory of the storage device may be used to obtain data internally. The shared memory may include a plurality of queues that are used to obtain data internally. At least one of the queues may be implemented using an array. Obtaining data internally may include providing I/O requests to a portion of the storage device that handles I/O requests. The portion of the storage device that handles I/O requests may be provided with bypass drivers that read data requests from a first internal path within the storage device and provide the results of servicing the I/O requests to a second internal path within the storage device. The first internal path and the second internal path may use shared memory.

According further to the present invention, computer software, provided in a computer readable storage medium, offloads application processing from a host processor system. The software includes executable code on the host processor system that provides requests to a storage device containing data for the application and executable code on the storage device that services the requests by obtaining data internally from the storage device and processing the data within the storage device to obtain a result thereof that is provided to the host processor system, where portions of the data that are not part of the result are not provided. Executable code on the storage system may run using the Linux operating system. Shared memory of the storage device may be used to obtain data internally. The shared memory may include a plurality of queues that are used to obtain data internally. At least one of the queues may be implemented using an array. Obtaining data internally may include providing I/O requests to a portion of the storage device that handles I/O requests. The computer software may also include executable code that reads data requests from a first internal path within the storage device and provides the results of servicing the I/O requests to a second internal path within the storage device. The first internal path and the second internal path may use shared memory.

According further to the present invention, a storage device includes a plurality of directors that handle receiving and sending data for the storage device and at least one processor system, in communication with at least one of the directors, where the at least one processor system includes a computer-readable storage medium that includes executable code within the storage device that receives requests from a source external to the storage device and executable code within the storage device that that services the requests by obtaining data internally from the storage device and processing the data within the storage device to obtain a result thereof, where portions of the data that are not part of the result are not provided external to the storage device. The storage device may also include shared memory that is used to obtain data internally. The shared memory may include a plurality of queues that are used to obtain data internally. The storage device may also include executable code that reads data requests from a first internal path within the storage device and provide the results of servicing the I/O requests to a second internal path within the storage device.

BRIEF DESCRIPTION OF DRAWINGS

FIG. 16 is a flow chart illustrating processing performed by an HA in connection with receiving data according to the system described herein.

FIG. 17 is a diagram illustrating a table used in connection with an alternative embodiment for handling request queues and/or response queues according to the system described herein.

DETAILED DESCRIPTION OF VARIOUS EMBODIMENTS

Figure 1:
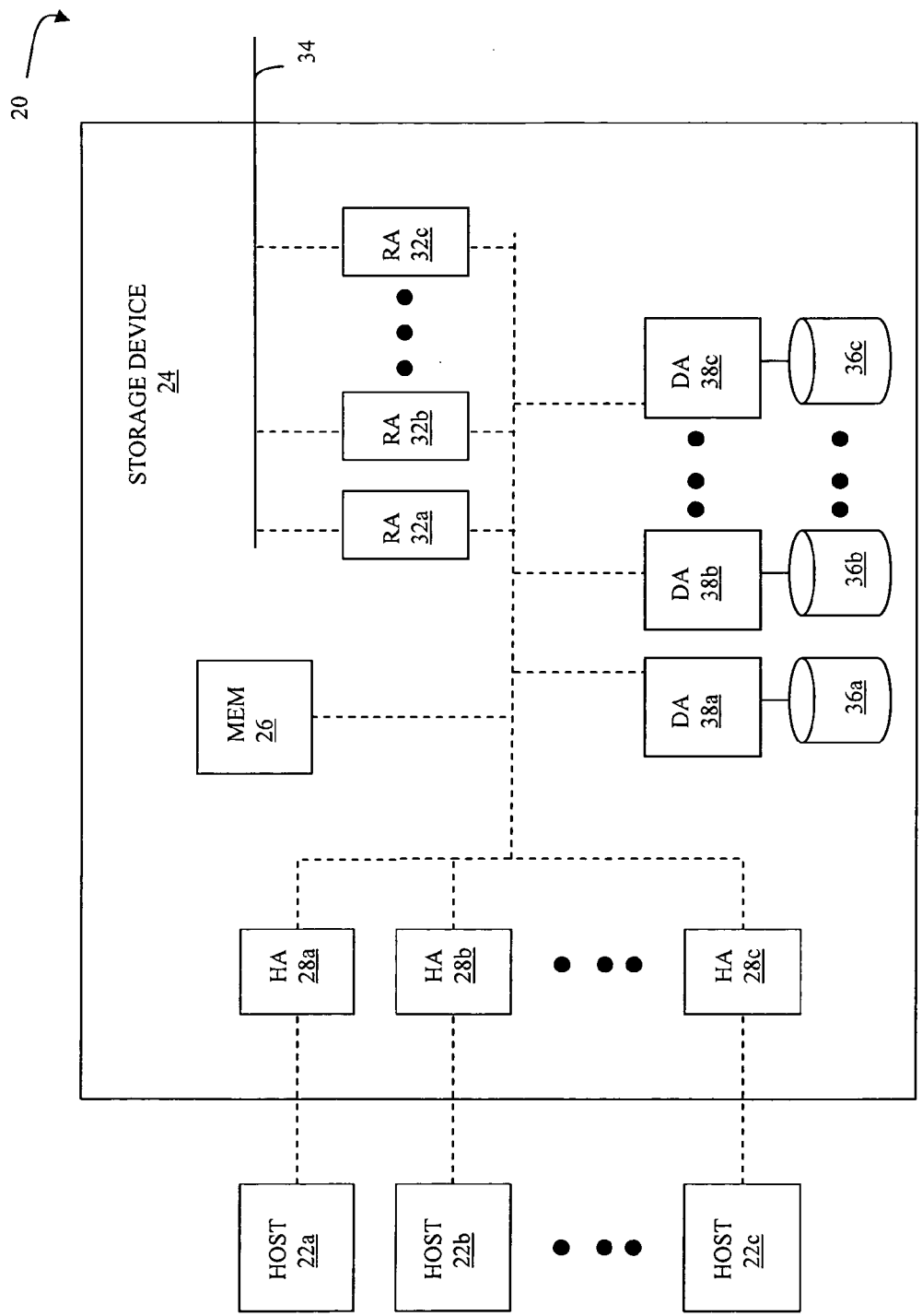
FIG. 1 is a schematic diagram illustrating a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HAs) 28a-28c that handle reading and writing of data between the hosts 22a-22c and the storage device 24. Although the diagram 20 shows each of the hosts 22a-22c coupled to each of the HAs 28a-28c, it will be appreciated by one of ordinary skill in the art that one or more of the HAs 28a-28c may be coupled to other hosts.

The storage device 24 may include one or more RDF adapter units (RAs) 32a-32c. The RAs 32a-32c are coupled to an RDF link 34 and are similar to the HAs 28a-28c, but are used to transfer data between the storage device 24 and other storage devices (not shown) that are also coupled to the RDF link 34. The storage device 24 may be coupled to additional RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DAs 38a-38c, the HAs 28a-28c, the RAs 32a-32c, and the memory 26. In some embodiments, one or more internal busses and/or communication modules may be used. In some embodiments, the memory 26 may be used to facilitate data transfers between the DAs 38a-38c, the HAs 28a-28c and the RAs 32a-32c. The memory 26 may contain tasks that are to be performed by one or more of the DAs 38a-38c, the HAs 28a-28c and the RAs 32a-32c. The memory 26 may also contain a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
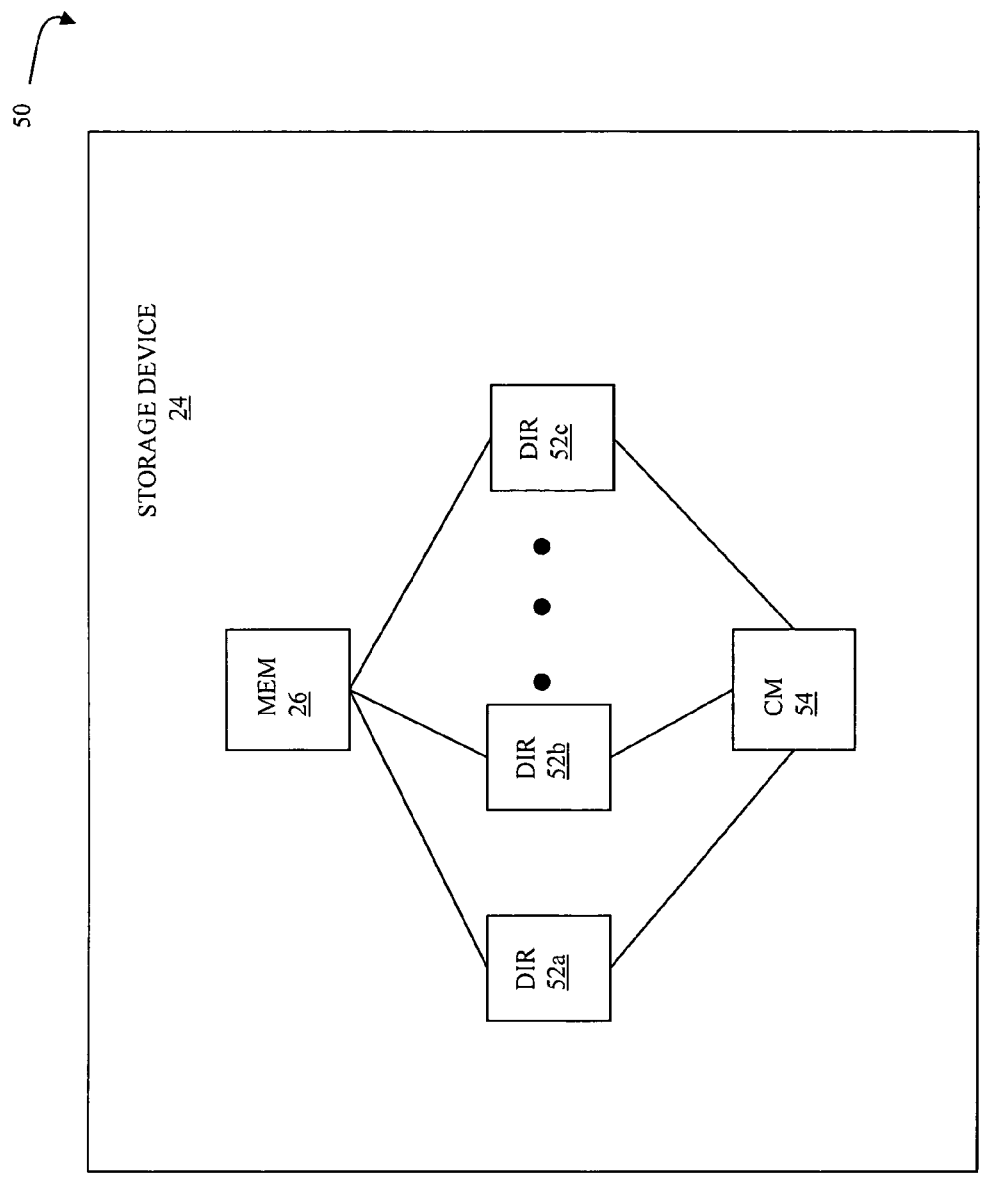
FIG. 2 is a schematic diagram illustrating a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one or more of the HAs 28a-28c, RAs 32a-32c, or DAs 38a-38c. In an embodiment disclosed herein, there may be up to sixty-four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all or a subset of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at one types of director and perform other processing with the other processing system. This is described in more detain elsewhere herein.

Figure 3:
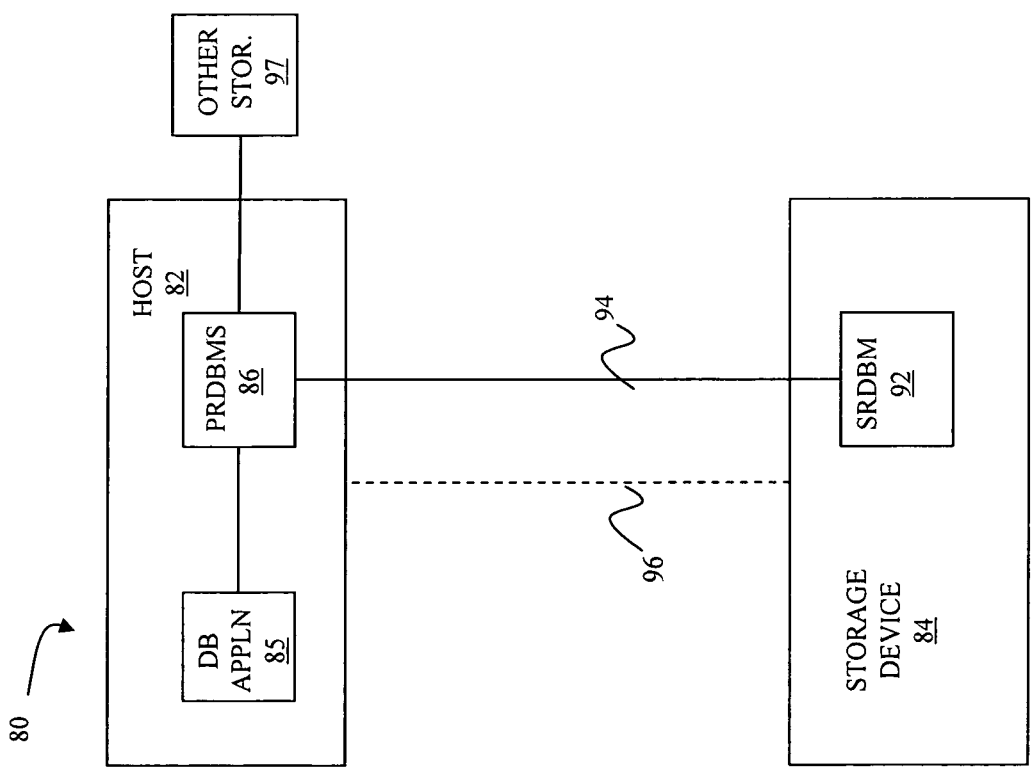
FIG. 3 is a diagram illustrating a host having a Primary Relational Database Management System and a storage device having a Secondary Relational Database Manager according to the system described herein.

Referring to FIG. 3, a system 80 includes a host 82 coupled to a storage device 84. The host 82 is like one of the hosts 22a-22c, discussed above while the storage device 84 is like the storage device 24, discussed above. The host 82 includes a database application 85 and a primary relational database management system (PRDBMS) 86, both of which may run on the host 82. The PRDBMS 86 interacts with the database application 85 in the same manner as a conventional RDBMS (e.g., using SQL). The database application 85 makes conventional RDBMS calls to the PRDBMS 86 and receives conventional RDBMS responses therefrom. Accordingly, the system described herein may work with any database application that is configured to interact with an RDBMS. In an embodiment herein, the database application 85 interacts with the PRDBMS 86 using any appropriate interface, such as SQL.

The storage device 84 includes a Secondary Relational Database Manager (SRDBM) 92 that communicates with the PRDBMS 86 via a link 94. The PRDBMS 86 may communicate with the SRDBM 92 using the DRDA protocol, although any appropriate communication technique/protocol may be used to provide the functionality described herein. The SRDBM 92 is integrated with the storage device 84 in a way that facilitates the SRDBM 92 performing some of the processing that would otherwise be performed on the host 82 by a conventional RDBMS. The storage device 84 may contain the database that is accessed and operated upon by the database application 85 running on the host 82. Operation of the SRDBM 92 is discussed in more detail elsewhere herein.

A second datalink 96 may be provided between the host 82 and the storage device 84. The second datalink 96 may correspond to an existing channel interface to provide a conventional data storage coupling between the host 82 and the storage device 84 while the other link 94 may be used for communication between the PRDBMS 86 and the SRDBM 92. In other embodiments, the second datalink 96 is not provided but, instead, the link 94 may be used for both conventional data coupling (existing channel interface) between the host 82 and the storage device 84 and for communication between the PRDBMS 86 and the SRDBM 92. In instances where the link 94 is used for both conventional data coupling and for communication between the PRDBMS 86 and the SRDBM 92, any appropriate mechanism may be used to allow the host 82 and the storage device 84 to distinguish between the different types of data/commands.

In some embodiments, additional other storage 97 may also be used. The other storage 97 may represent another storage device like the storage device 84 or any other type of storage device. The other storage device 97 may be a local disk for the host 82. Thus, in embodiments where the other storage device 97 is used, the PRDBMS 86 may access both the storage device 84 and the other storage 97. The link to the other storage 97 may be any appropriate data link.

The system 80 provides a mechanism whereby a significant amount of the processing associated with data intensive applications, such as database applications, may be offloaded from the host 82 to the storage device 84. In addition, for some operations, the amount of data that needs to be exchanged between the host 82 and the storage device 84 may be reduced. For example, if the database application 85 makes an RDBMS call to sort the database that is provided on the storage device 84, the SRDBM 92 may perform the sort at the storage device 84 without having to transfer any records from the storage device 84 to the host 82 in connection with the sort operation. In contrast, with a conventional RDBMS running on the host 82 and accessing data on the storage device 84, a call from the database application 85 to perform a sort would cause a significant amount of data to be transferred between the host 82 and the storage device 84 in connection with the sort operation in order to perform the sort on the host 82 rather than on the storage device 84.

In one embodiment, both the PRDBMS 86 and the SRDBM 92 are conventional, commercially-available, RDBMS that provide full RDBMS functionality. The SRDBMS 86 and the SRDBM 92 may be the same software package (i.e., from the same vendor) or may be different software packages. In other embodiments, the PRDBMS 86 is simply a communication layer that passes on all RDBMS requests to the SRDBM 92. Of course, for embodiments where the PRDBMS 86 is simply a communication layer, it may not be possible to include the other storage 97 unless the other storage includes a corresponding SRDBM like the SRDBM 92. Note that the PRDBMS 86 may communicate with the SRDBM 92 using any protocol that is understood by both, including proprietary protocols used by specific database vendors. Note also that it is possible for the PRDBMS 86 to use the same protocol to communicate with both the database application 85 and with the SRDBM 92 (e.g., the DRDA protocol). It is also possible for the PRDBMS 86 to use a different protocol to communicate with the database application 85 than the protocol used to communicate with the SRDBM 92.

Figure 4:
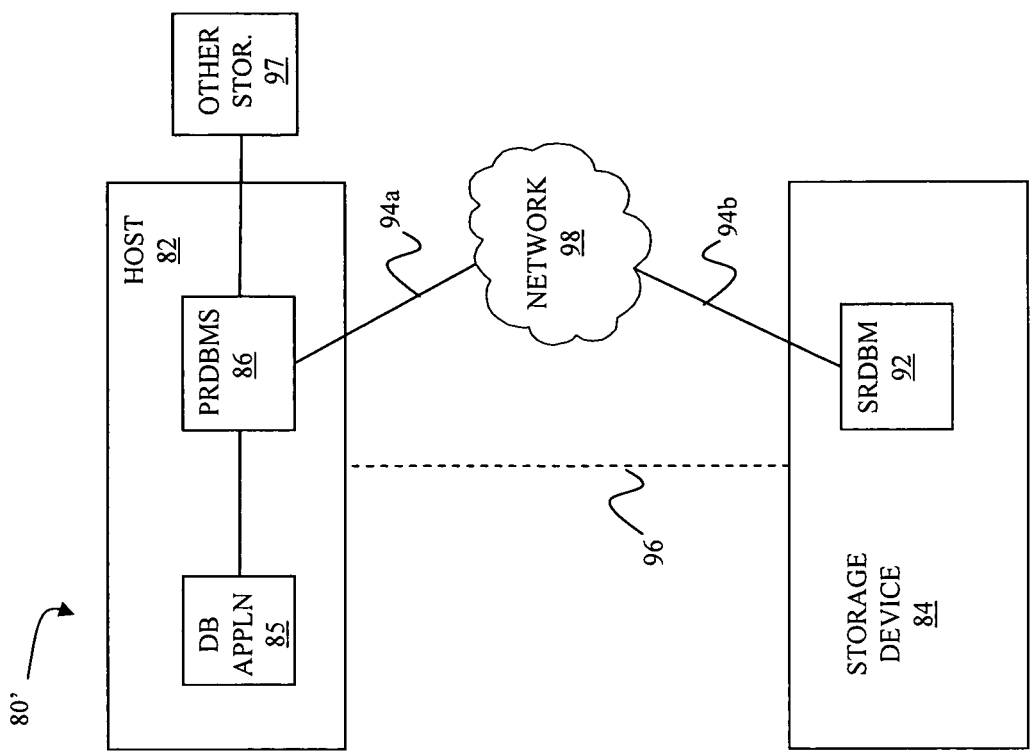
FIG. 4 is a diagram illustrating a host having an Primary Relational Database Management System coupled to a Secondary Relational Database Manager on a storage device via a data network according to the system described herein.

Referring to FIG. 4, an alternative system 80' is like the system 80 discussed above in connection with FIG. 3. However, the system 80' shows a network 98 that may be used to facilitate communication between the PRDBMS 86 and the SRDBM 92. The network 98 could be any data communication network, such as the Internet. The network 98 could also represent an internal data network of an organization, a wide area network for an organization or group of organizations, or any other data communication network. The PRDBMS 82 is coupled to the network 98 via a first connection 94a while the SRDBM 92 is coupled to the network 98 via a second connection 94b. The connections 94a, 94b to the network 98 may be provided in any appropriate manner. The system 80' may also include the optional second datalink 96 between the host 82 and the storage device 84. In an embodiment herein, the PRDBMS 86 and the SRDBM 92 communicate via a TCP/IP network using an appropriate protocol, such as DRDA.

Figure 5:
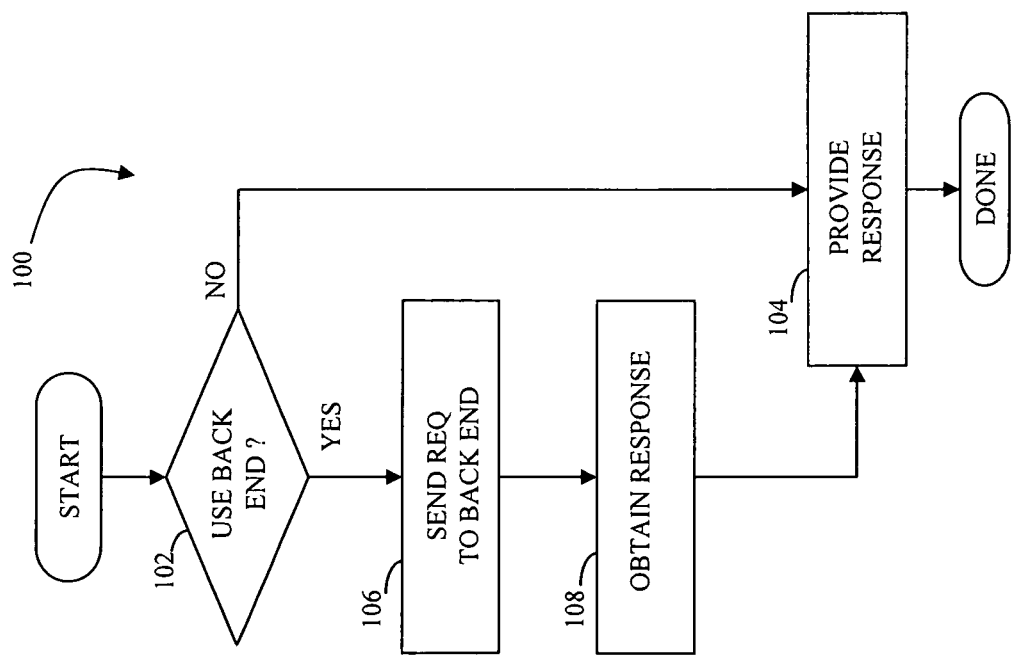
FIG. 5 is a flow chart illustrating operation of an Primary Relational Database Management System according to the system described herein.

Referring to FIG. 5, a flow chart 100 illustrates steps performed by the PRDBMS 86 in connection with servicing requests by the database application 85. The processing illustrated by the flow chart 100 corresponds to a system where the PRDBMS 86 is more than a communication layer (discussed above). Processing begins at a first test step 102 where it is determined if the request by the database application 85 is to be serviced by the SRDBM 92. The division of which operations are performed by the PRDBMS 86 without the assistance of the SRDBM 92 and which operations are performed with the assistance of the SRDBM 92 is a choice for the designer of the PRDBMS 85 and SRDBM 92 based on a variety of functional factors familiar to one of ordinary skill in the art. Generally, it is useful to have the SRDBM 92, which runs on the storage device 84, perform operations that require a significant amount of accessing of the data on the storage device 84 in order to advantageously minimize the amount of data that is transferred between the storage device 84 and the host 82. Thus, for example, operations performed by the SRDBM 92 may include database sort and search operations while operations performed by the PRDBMS 86 without use of the SRDBM 92 may include status operations and possibly operations for which a previous result would have been cached by the PRDBMS 86.

If it is determined at the test step 102 that the request provided to the PRDBMS 86 does not require processing by the SRDBM 92, then control passes from the test step 102 to a step 104 where the PRDBMS 86 provides a response to the calling process (e.g., the database application 85). Following the step 104, processing is complete. Note that, for embodiments where the PRDBMS 86 is a communication layer, the PRDBMS may use the SRDBM 92 for a significant number, if not all, requests provided to the PRDBMS 86.

If it is determined at the test step 102 that the request provided to the PRDBMS 86 can use processing provided by the SRDBM 92, then control transfers from the test step 102 to a step 106 where the request is provided to the SRDBM 92 using, for example, the network 98. Note that, in some instances, a modified version of the request may be provided. For example, in some embodiments, the PRDBMS 86 may provide the SRDBM 92 with an appropriately formatted request (e.g., DRDA), which may be different than the format of the request received from the database application 85 by the PRDBMS 86 (e.g., SQL). Any reformatting of requests that is performed by the PRDBMS 86 is straightforward to one of ordinary skill in the art and depends, at least in part, on the division of functionality between the PRDBMS 86 and the SRDBM 92 as well as the various protocols that are used.

In some embodiments, the SRDBM 92 may service requests provided by sources other than the PRDBMS 86 (e.g., other PRDBMSs, specially adapted applications, etc.). Thus, it may be possible to allow any external process/device to present a properly formatted request to the SRDBM 92 and have that request serviced by the SRDBM 92 which would provide the result thereof to the external process/device.

Following the step 106 is a step 108 where the PRDBMS 86 waits for a response to the request provided to the SRDBM 92. Following the step 108, control transfers to the step 104, discussed above, where the result of the request is provided to the process that called the PRDBMS 86 (e.g., to the database application 85). Following the step 104, processing is complete.

Figure 6:
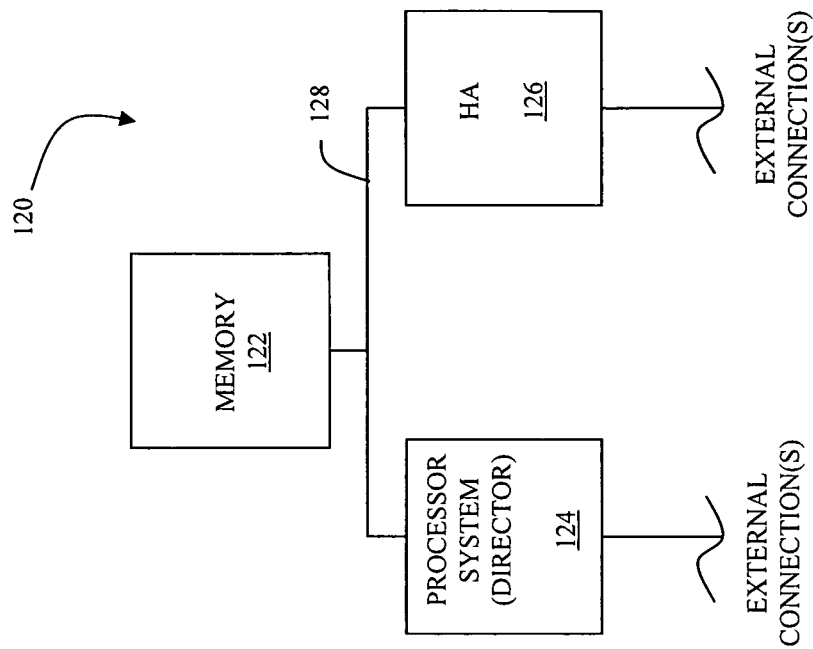
FIG. 6 is a diagram illustrating a processor system, an HA, and a memory that are part of a storage device according to the system described herein.

Referring to FIG. 6, a diagram 120 illustrates a possible embodiment for providing the functionality for the SRDBM 92 at the storage device 84. The diagram 120 shows a memory 122, a processor system 124, and an HA 126 all coupled to a bus 128. The diagram 120 represents a portion of internal hardware/systems for the storage device 84 that may be used to implement the SRDBM 92. Thus, the memory 122 may correspond to the memory 26 discussed above in connection with the storage device 24 shown in FIG. 1. The HA 126 may be a modified version (as discussed elsewhere herein) of one of the HAs 28a-28c discussed above in connection with the storage device 24 shown in FIG. 1. The processor system 124 may be a director like the directors 52a-52c discussed above in connection with the storage device 24 shown in FIG. 2.

The HA 126 receives data requests from the processor system 124 via the memory 122. As discussed elsewhere herein, the device drivers of the HA 126 cause the software of the HA 126 to read and write data as if the data were being transferred via a conventional HA connection, such as a SCSI connection or a Fibre Channel connection. The HA 126 services of the requests and provides the result thereof to the memory 122. The processor system 124 may then obtain the results by accessing the memory 122. As discussed elsewhere herein, the device drivers of the processor system 124 (e.g., HBA drivers) may cause the software of the processor system 124 to read and write data as if the data were being transferred via a conventional connection, such as a SCSI connection or a Fibre Channel connection.

Both the processor system 124 and the HA 126 are shown as including external connections. However, in the case of the processor system 124, the external connection may be used to receive requests from the PRDBMS 86 (via, for example, the network 98). In the case of the HA 126, the external connection may be used to provide conventional connections for the HA 126 unrelated to the functionality discussed herein such as, for example, connections to one or more hosts.

In an embodiment herein, the processor system 124 runs the Linux operating system, although other appropriate operating systems may be used. The SRDBM 92 runs on the processor system 124 under the Linux operating system. Thus, in an embodiment herein, the SRDBM 92 is implemented using a conventional, commercially-available, RDBMS that runs under the Linux operating system. As discussed in more detail elsewhere herein, the device drivers of the processor system 124 and the device drivers of the HA 126 provide for I/O operations using the memory 122 rather than through conventional external connections. Accordingly, both the RDBMS application and the operating system of the processor system 124 may be conventional, commercially-available, systems that do not need extensive (or any) modifications to provide the functionality described herein.

Figure 7:
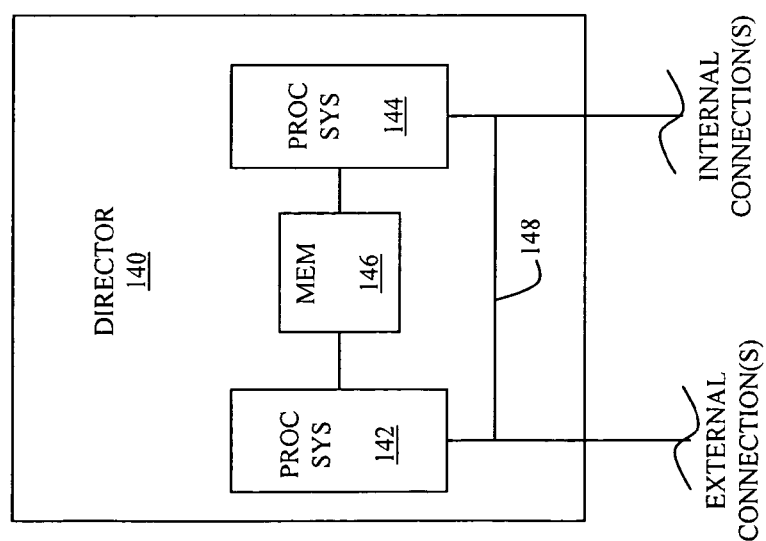
FIG. 7 is a diagram illustrating a director having thereon a first processor system, a second processor system, and a shared memory according to the system described herein.

Referring to FIG. 7, a director 140 is shown as including a first processor system 142 and a second processor system 144. In an embodiment herein, at least one of the directors used with a storage device may include two or more separate processor systems, each being able to run a different operating system than an operating system run by another processors system on the same director. In an embodiment herein, the first processor system 142 runs the Linux operating system along with the SRDBM 92 while the second processor system 144 runs an operating system consistent with providing HA functionality.

A shared memory 146 is coupled to the first processor system 142 and to the second processor system 144. The shared memory 146 may be used to facilitate communication between the first processor system 142 and a second processor system 144. The first processor system 142 and the second processor system 144 may also be coupled via a bus 148 that provides connections for the director 140, including one or more external connections and one or more internal connections to storage device components. The hardware for the director 140 may be implemented in a straightforward manner based on the description herein using conventional components.

Note that it is possible to provide a virtual machine like the hardware illustrated by FIG. 7 using different hardware and appropriate virtualization software, such as the commercially available VMware product.

Figure 8:
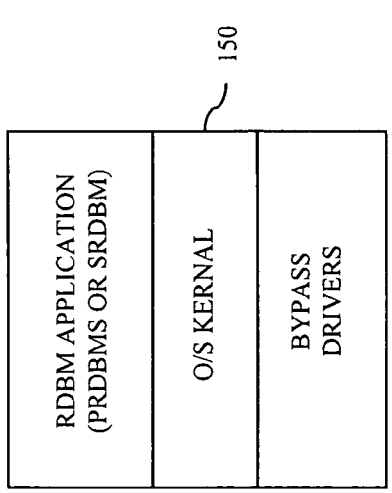
FIG. 8 is a diagram illustrating software that provides the Secondary Relational Database Manager with bypass drivers according to the system described herein.

Referring to FIG. 8, a diagram 150 shows a conventional RDBMS that provides the functionality for the SRDBM 92. The RDBMS runs on an O/S kernel, such as a Linux kernel. The O/S kernel uses bypass drivers to allow the RDBMS to communicate through shared memory, as discussed elsewhere herein. Thus, standard read and write calls made by the RDBMS cause data to be read from and written to the shared memory rather than through a conventional connection (e.g., a SCSI connection). Operation and implementation of the bypass drivers is discussed in more detail elsewhere herein.

Figure 9:
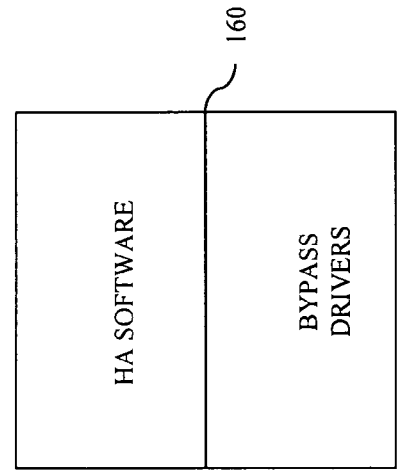
FIG. 9 is a diagram illustrating software for an HA with bypass drivers according to the system described herein.

Referring to FIG. 9, a diagram 160 shows HA software interacting with bypass drivers to provide the functionality described herein. Data written by the RDBMS to the shared memory is read by the bypass drivers and presented to the HA software as if the data had come from an external device, such as a host device coupled using a SCSI or Fibre Channel connection. Thus, the HA software receives requests for reading and writing data on the storage device as if the requests had been presented by an external device even though the requests are actually through the shared memory. Similarly, the bypass drivers caused the HA software to write data to the shared memory even though the HA software is performing the operations that would be performed in connection with providing data to an external device, such as a host. Accordingly, the HA software receives requests as if the request had come from an external host and fulfills those requests by writing data as if the data were being written to an external host. The bypass drivers cause the requests and data to be read from and written to the shared memory.

Figure 10:
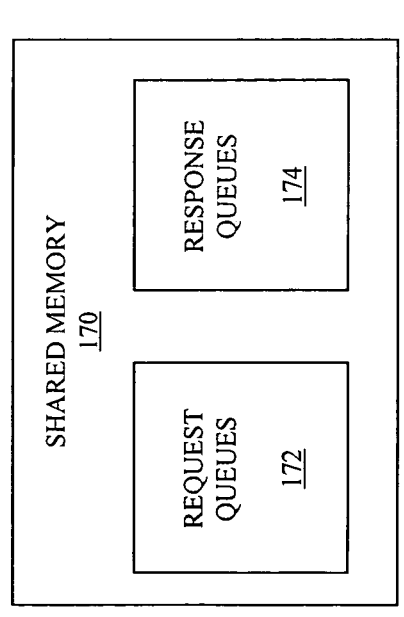
FIG. 10 is a diagram illustrating a shared memory having request queues and response queues according to the system described herein.

Referring to FIG. 10, a shared memory 170 is shown in more detail as including one or more request queues 172 and one or more response queues 174. The request queues 172 may be used to pass requests from the SRDBM 92 to the HA. As discussed elsewhere herein, the drivers of the HA cause the requests passing through the shared memory 170 to appear to the HA software to have been requests coming from an external device, such as a host. Similarly, the drivers used in connection with the SRDBM 92 cause the SRDBM 92 to perform operations as if the requests are being provided to an external device even though the requests are, in fact, being provided to the shared memory 170.

The response queues 174 may be used to pass data from the HA to the SRDBM 92. Just as with the request queues 172, the HA software performs as if responses are being provided to an external device (such as a host) while, in fact, the responses are being provided to the shared memory 170. Similarly, the drivers used in connection with the SRDBM 92 cause the RDBMS to perform as if the responses are being provided by an external device when, in fact, the responses are being provided through the shared memory 170.

Figure 11:
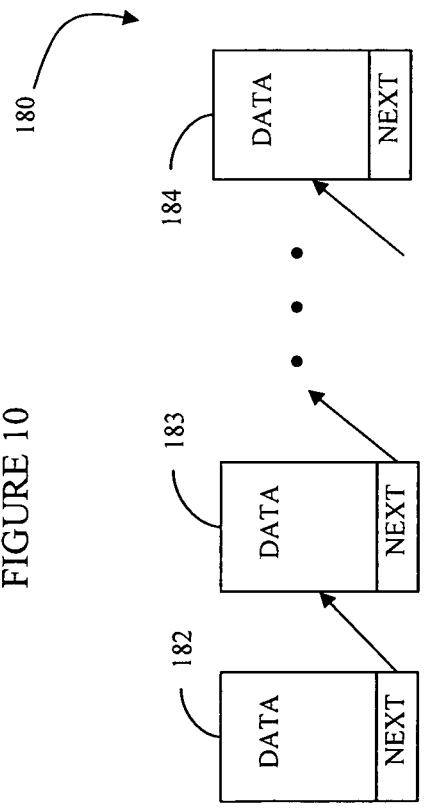
FIG. 11 is a diagram illustrating a linked list used in connection with request queues and/or response queues according to the system described herein.

Referring to FIG. 11, a linked list 180 may be used to provide the request queues 172 and/or the response queues 174. Of course, any other appropriate data structure may be used to provide one or more of the queues, including other types of linked lists, arrays, etc. The linked list 180 includes a plurality of elements 182-184, each of which contains a data field and a next field. The data field of each of the elements 182-184 is the request or response data provided by the HA or the SRDBM 92 to the shared memory 170. Any appropriate data format may be used. For example, it is possible to exchange data between the HA and the SRDBM 92 using a SCSI I/O format to encapsulate a SCSI command or encapsulate a SCSI response command description block.

The next field of each of the elements 182-184 points to the next element in the linked list 180. The next field for the last item in the linked list 180 is a null pointer, indicating the end of the list. A top pointer points to the first element in the linked list 180. Manipulation of the linked list 180 is discussed in more detail elsewhere herein, although it is noted that any conventional linked list processing may be used, including processing where both a top pointer and a bottom pointer (first pointer and last pointer) are used.

Figure 12:
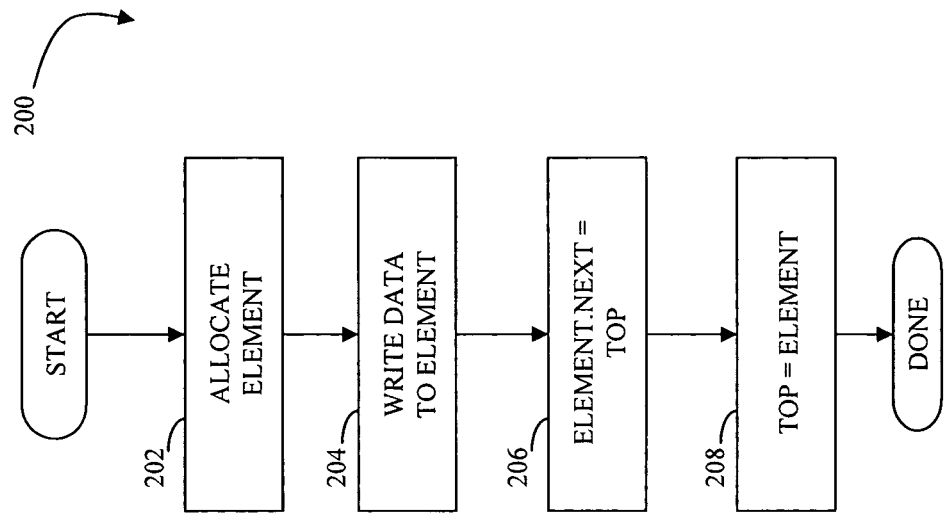
FIG. 12 is a flow chart illustrating writing data to shared memory according to the system described herein.

Referring to FIG. 12, a flow chart 200 illustrates steps performed in connection with adding an element to one of the request queues 172 and/or one of the response queues 174. As discussed elsewhere herein, the SRDBM 92 may add a request to one of the request queues 172 while the HA may add a response to one of the response queues 174. Note that the processing illustrated by the flow chart 200 corresponds to modifications that may be made to be device drivers, as discussed elsewhere herein.

Processing begins at a first step 202 where memory is allocated for a new element to add to one of the queues 172, 174. The particular allocation mechanism used at the step 202 depends upon the particular scheme used to allocate and dispose of elements used in connection with the queues 172, 174. Following the step 202 is a step 204 where the data is output (written) to the newly allocated element by the bypass driver. The data that is output at the step 204 corresponds to the type of operation being performed (request or response) and, of course, the protocol that is being used for communication. Following the step 204 is a step 206 where the next field of the newly allocated element is set equal to the top pointer that points to the first element of the queue to which data is being added. Following the step 206 is a step 208 where the top pointer is made to point to be newly allocated element. Following the step 208, processing is complete.

Figure 13:
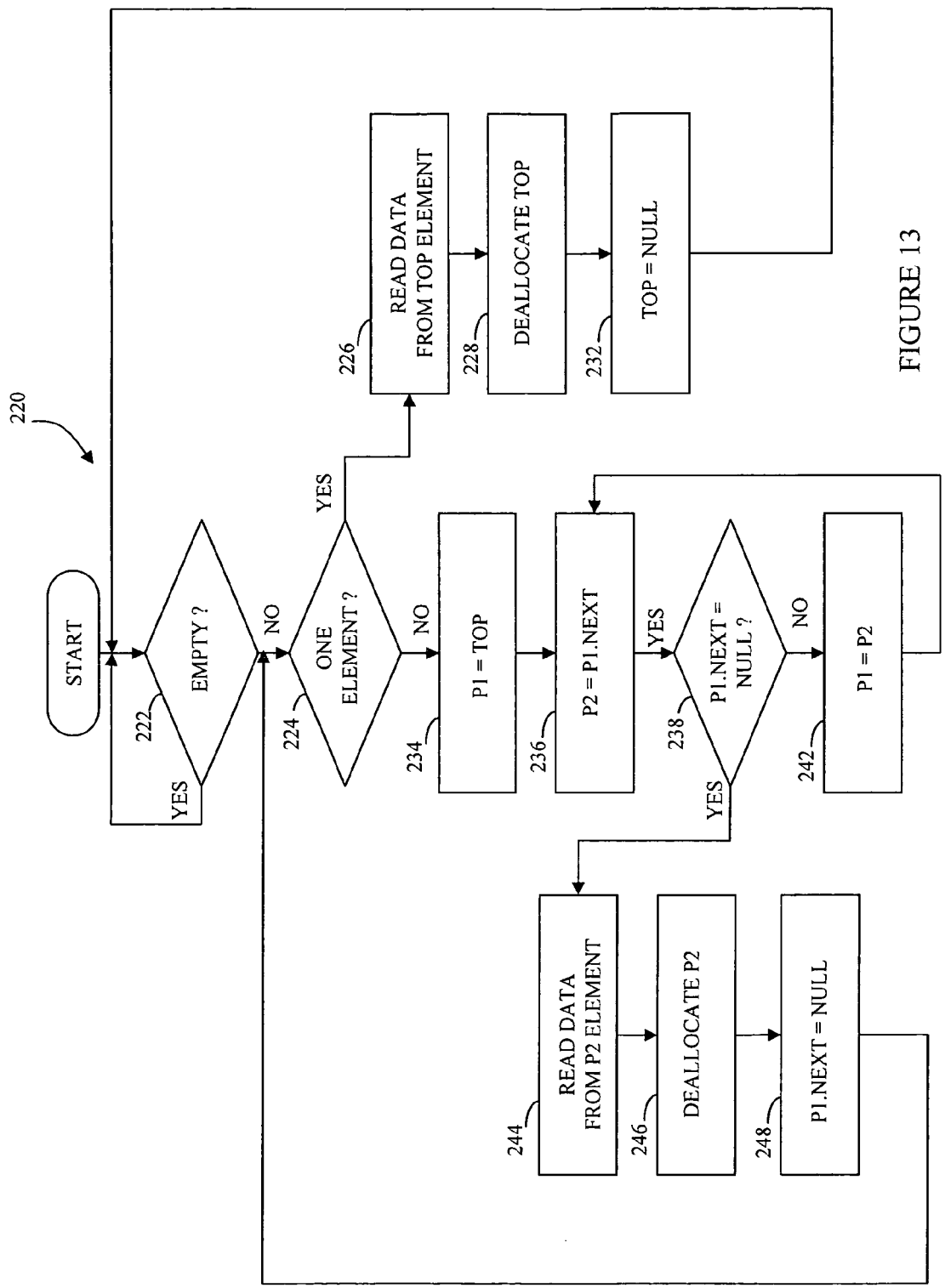
FIG. 13 is a flow chart illustrating reading data from shared memory according to the system described herein.

Referring to FIG. 13, a flow chart 220 illustrates steps performed in connection with polling and removing data provided in connection with one of the request queues 172 and/or response queues 174. As discussed elsewhere herein, the SRDBM 92 receives data from the HA by one or more of the response queues 174 while the HA receives data from the SRDBM 92 via one or more of the request queues 172. Thus, the processing illustrated by the flow chart 220 corresponds to modifications that may be made to device drivers, as discussed elsewhere herein.

Processing begins at a first test step 222 where it is determined if the queue being processed is empty (i.e., the top pointer is a null pointer). If so, then processing loops back to the step 222 to continue polling until the queue is no longer empty. Note that, instead of polling, alternative mechanisms may be used, depending on the features of the underlying hardware/software. These alternative mechanisms include an inter-CPU signaling mechanism or a virtual interrupt mechanism to communicate between the components.

Once it is determined at the test step 222 that the queue is not empty, then control transfers from the test step 222 to a test step 224 which determines if the queue contains exactly one element (i.e., by testing if top next equals null). If so, then control transfers from the test step 224 to a step 226 where the data from the element is received (read) by the bypass driver. Once the data has been read by the bypass driver, it is provided to follow on processing for appropriate handling. For example, if the bypass driver is part of the HA, and the data that is read is a request, then the follow on processing includes the HA processing the request.

Following the step 226 is a step 228 where the element pointed to by the top pointer is deallocated. The particular mechanism used to deallocate the element at the step 228 depends upon the particular scheme used to allocate and dispose of elements used in connection with the queues 172, 174. Following the step 228 is a step 232 where the top pointer is set equal to null. Following the step 232, control transfers back to the step 222 to continue polling the queue to wait for more data to be written thereto.

If it is determined at the test step 224 that the queue contains more than one element, then control transfers from the test step 224 to a step 234 where a temporary pointer, P1, is set equal to the top pointer. Following the step 234 is a step 236 where a second temporary pointer, P2, is set equal to the next field pointed to by the P1 pointer (P1.next). Following the step 236 is a test step 238 where it is determined if P2 points to the last element in the list (i.e., whether P2.next equals null). If not, then control transfers from the test step 238 to a step 242 where P1 is set equal to P2. Following the step 242, control transfers back to the step 236 for a next iteration.

If it is determined at the test step 238 that P2 does point to the last element in the queue, then control transfers from the test step 238 to a step 244 where the data field in the element pointed to by P2 is received (read). Following the step 244 is a step 246 where the element pointed to by P2 is deallocated. Following the step 246 is a step 248 where the next field and the element pointed to by P1 is set equal to null. Following the step 248, control transfers back to a test step 224 to continue receiving (reading) data.

Figure 14:
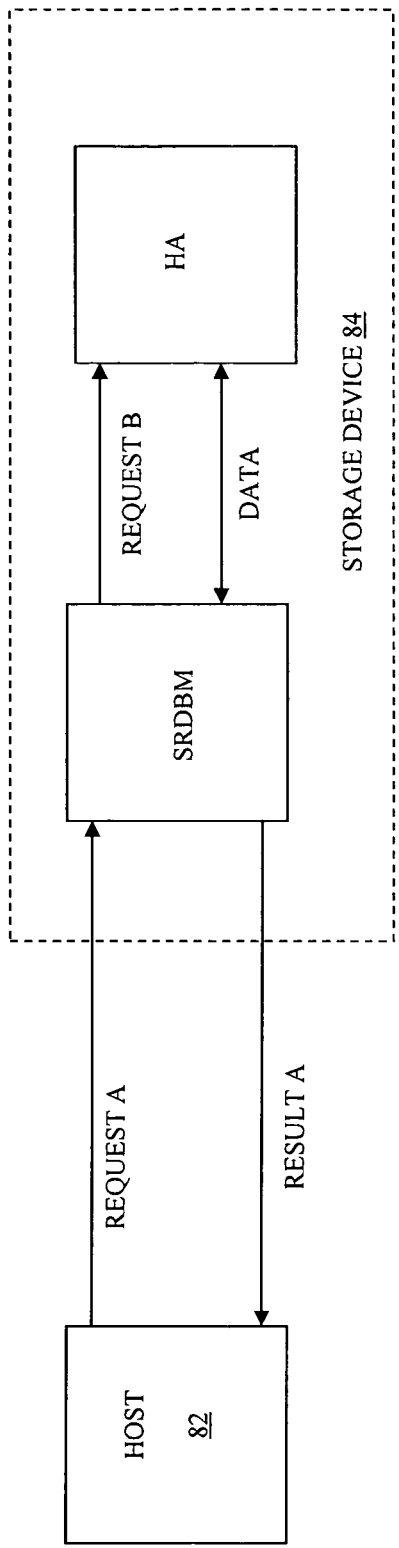
FIG. 14 is a diagram illustrating interaction between a host, an Secondary Relational Database Manager, and an HA according to the system described herein.

Referring to FIG. 14, a possible configuration is shown for the host 82 and the storage device 84. In the configuration illustrated by FIG. 14, the host 82 communicates with the SRDBM. As discussed elsewhere herein, the PRDBMS 86 running on the host 82 provides requests and receives responses. As illustrated in FIG. 14, the host 82 initially provides a Request A to the SRDBM. Request A may be in any appropriate format. In response to receiving request A, the SRDBM generates a corresponding request B to provide to the HA. Note that request A and request B may be different or the same, as discussed elsewhere herein. For example, request A may be a request to sort a plurality of database records, in which case request B maybe a request to the HA to provide the records of the database so that the SRDBM may sort the records. As shown in FIG. 14, the SRDBM 92 may exchange data with the HA in connection with performing the requested operation (e.g., a sort). Upon completion, the SRDBM may provide the results of the operation (Result A) to the host 82.

Note that there may be a one to many relationship between Request A and Request B so that a single Request A transaction spawns multiple Request B transactions. For example, Request A could be a request for database records have a field with a value over a certain amount, in which case Request B, and the corresponding data exchange, could result in hundreds or thousands of I/O operations between the HA and the SRDBM. Note also that, although a relatively significant amount data may be exchanged between the HA and the SRDBM, the exchange is internal to the storage device 84. Data that is not part of the Result A is not transmitted outside the storage device 84. Thus, for example, if Request A requests a database record with a highest value for a particular field, the HA may pass all of the database records to the SRDBM in connection with fulfilling the request, but only the record with the highest value (Result A) needs to be transmitted from the storage device 84.

Figure 15:
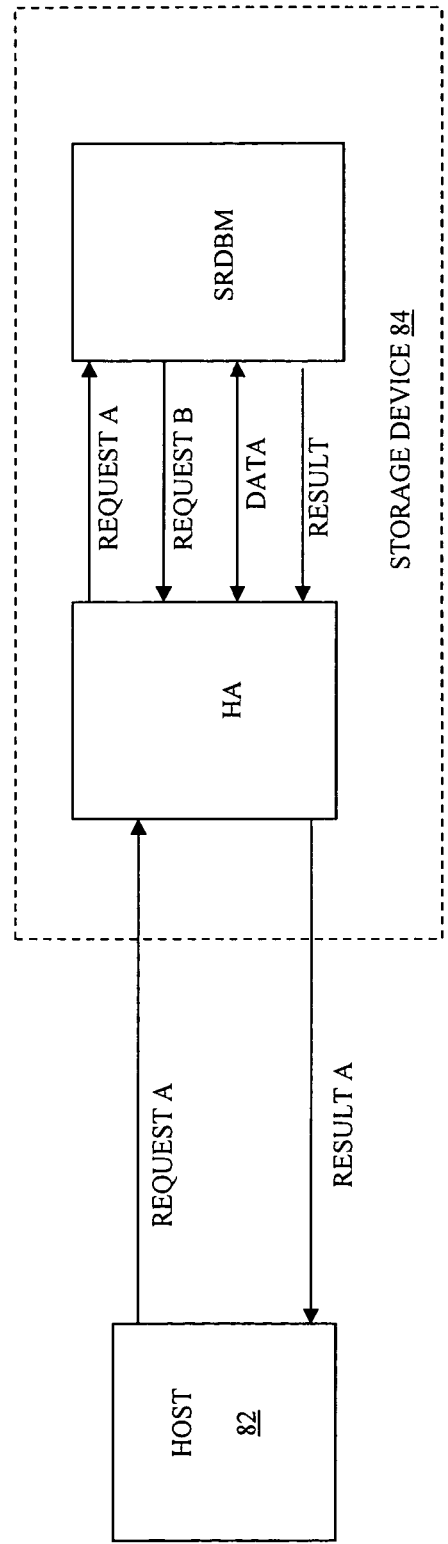
FIG. 15 is a diagram illustrating an alternative embodiment for an interaction between a host, an Secondary Relational Database Manager, and an HA according to the system described herein.

Referring to FIG. 15, an alternative arrangement between the host 82 and the storage device 84 shows the host 82 coupled only to the HA. In the arrangement of FIG. 15, the HA may act as a conduit to pass request A to the SRDBM. Just as with the configuration illustrated in FIG. 14, the SRDBM may, in response to request A, provide a request B to the HA and may exchange data with the HA. When the operation is complete, the SRDBM may provide the result thereof (Result A) to the HA, which passes the result back to the host 82. Just as with FIG. 14, there may be a one to many relationship between Request A and Request B and much of the data transfer may remain internal to the storage device 84.

Referring to FIG. 16, a flow chart 260 illustrates steps performed by the HA in connection with handling data. The processing illustrated by the flow chart 260 may be used in the configuration illustrated by FIG. 15. Processing begins at a first test step 262 where the HA determines if the received data is for the SRDBM 92. If so, then control transfers from the test step 262 to a step 264 where the data is passed to the SRDBM 92 using, for example, the shared memory. Following the step 264, processing is complete.

If it is determined at the test step 262 at the data is not for the SRDBM 92, then control transfers from the test step 262 to a test step 266 where it is determined if the data is from the SRDBM 92. If so, then control transfers from the test step 266 to a step 268 were the data is passed through in an appropriate manner (e.g., shared memory) consistent with the discussion herein. Following the step 268, processing is complete. Otherwise, if it is determined at the test step 266 that the data is not from the SRDBM, then control transfers from the test step 266 to a step 272 where the data is handled in a conventional fashion (e.g., transfer from host to storage device). Following the step 272, processing is complete.

Referring to FIG. 17, a table 280 illustrates an alternative embodiment for providing the request queues 172 and/or the response queues 174 in shared memory. The table 280 includes a plurality of elements 282-286, each of which contains a data field and a next field. Each of the elements 282-286 is the request or response data provided by the HA or the SRDBM 92 to shared memory. Any appropriate data format may be used. For example, it is possible to exchange data between the HA and the SRDBM 92 using a SCSI I/O format to encapsulate a SCSI command or encapsulate a SCSI response command description block.

Two pointers are used with the table 280, a consumer pointer (CON) and a producer pointer (PROD). The PROD pointer points to the one of the elements 282-286 having free space while the CON pointer points to the oldest one of the elements 282-286 added to the table 280. The pointers are incremented modulo the size of the table 280 as data is added or removed therefrom. When the CON pointer points to the same element as the PROD pointer, the table 280 is empty. When the CON pointer equals the PROD pointer plus one modulo size, the table 280 is full.

Figure 18:
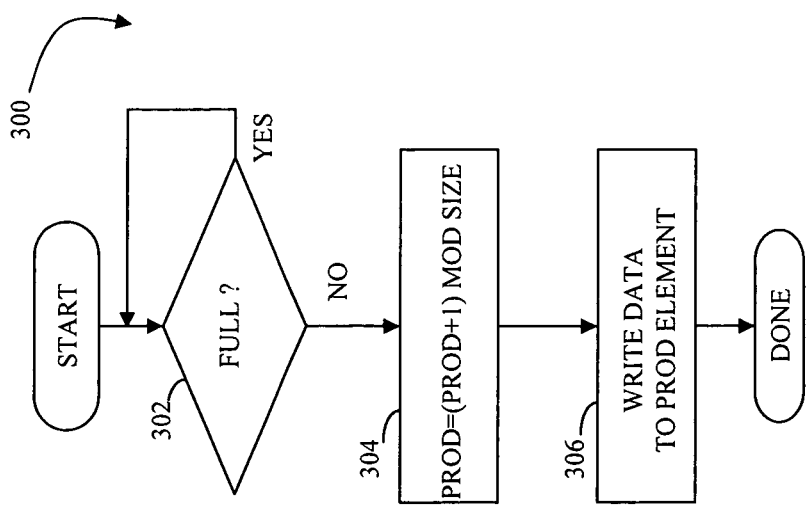
FIG. 18 is a flow chart illustrating an alternative embodiment for writing data to shared memory according to the system described herein.

Referring to FIG. 18, a flow chart 300 illustrates steps performed in connection with an alternative embodiment for adding an element to one of the request queues 172 and/or one of the response queues 174. As discussed elsewhere herein, the SRDBM 92 may add a request to one of the request queues 172 while the HA may add a response to one of the response queues 174. Note that the processing illustrated by the flow chart 300 corresponds to modifications that may be made to be device drivers, as discussed elsewhere herein.

Processing begins at a first test step 302 where it is determined if the table 280 is full. If so, then processing loops back to the step 302 to wait for a consumer process (discussed elsewhere herein) to remove data from the table 280. If it is determined at the test step 302 that the table 280 is not full, then control transfers from the test step 302 to a step 304 where the PROD pointer is incremented. Following the step 304 is a step 306 where the data being written is copied to the element pointed to by the PROD pointer. Following the step 306, processing is complete.

Figure 19:
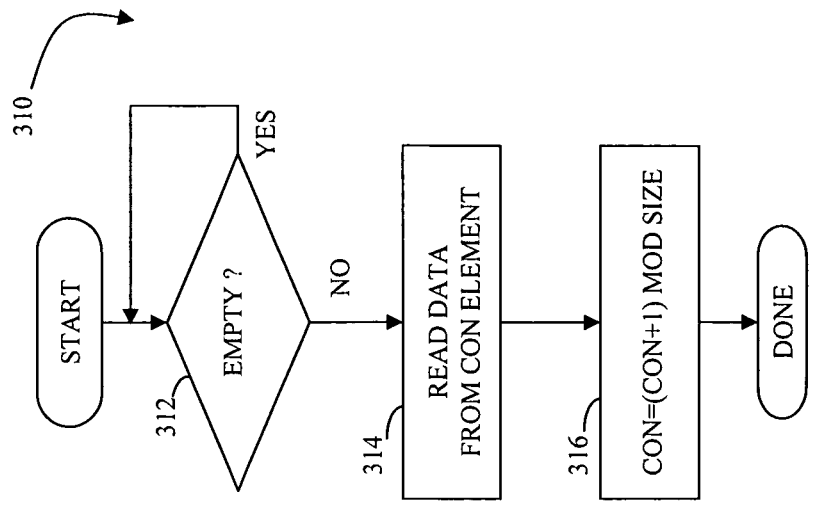
FIG. 19 is a flow chart illustrating an alternative embodiment for reading data from shared memory according to the system described herein.

Referring to FIG. 19, a flow chart 310 illustrates steps performed in connection with removing data from the table 280 to read one of the request queues 172 and/or response queues 174. As discussed elsewhere herein, the SRDBM 92 receives data from the HA by one or more of the response queues 174 while the HA receives data from the SRDBM 92 via one or more of the request queues 172. Thus, the processing illustrated by the flow chart 310 corresponds to modifications that may be made to be device drivers, as discussed elsewhere herein.

Processing begins at a first test step 312 where it is determined if the table 280 is empty. If so, then processing loops back to the step 312 to wait for some other process to add data from the table 280. If it is determined at the test step 312 that the table 280 is not empty, then control transfers from the test step 312 to a step 314 where the data is copied from the element pointed to by the CON pointer. Following the step 314 is a step 316 where the CON pointer is incremented. Following the step 316, processing is complete.

In an alternative embodiment, a single processor system may be configured to handle the SRDBM processing and interaction internally with the storage device. The single processor system may simulate an HA so that the single processor system appears to the remainder of the storage device to be an HA. Such an embodiment may be implemented by porting HA software to the Linux operating system and then running the Linux O/S, the RDBMS application, and the ported HA software on the single processor system.

Note that although the system is disclosed herein using shared memory, any other appropriate technique may be used for passing data, including bus-based protocols (e.g., RapidIO, Infiniband) or network based protocols using, for example, TCP/IP. Note also that the system described herein may be used for other types of database application (non-relational database applications).

The system described herein may be extended to be used for any type of application for which offloading I/O operations and/or processing cycles to a storage device is deemed advantageous. An application may be divided into parts, with one part running directly on the storage device. It may be advantageous to place on the storage device the part of the application that uses data for the application stored on the storage device. A part of the application on a host processor system communicates with the part of the application on the storage device to provide requests thereto and receive results therefrom in a manner similar to that described elsewhere herein in connection with databases. Note that, in this context, the term "host processor system" can include any processing device capable of providing requests to the storage device and thus could include another storage device.

While the invention has been disclosed in connection with various embodiments, modifications thereon will be readily apparent to those skilled in the art. Accordingly, the spirit and scope of the invention is set forth in the following claims.

What is claimed is:

1. A method of handling a database request, comprising:
   executing a database application that requires use of data stored in a database within a storage device, wherein the database application generates a first database request to access particular data stored in the database within the storage device, wherein the database application is executed on a host that is external to the storage device;
   providing a first database manager within the storage device;
   providing the first database request to the first database manager on the storage device;
   generating, at the first database manager, a second database request based on the first database request and transmitting the second database request to an input/output (I/O) component of the storage device that controls I/O of data to and from the storage device;
   the I/O component servicing the second database request by obtaining unprocessed data from the database within the storage device and transmitting the unprocessed data to the first database manager; and
   the first database manager servicing the first database request by processing the unprocessed data obtained from the I/O component to provide a result thereof that includes the particular data requested by the database application, wherein the particular data contains less data than the unprocessed data received by the first database manager from the I/O component, wherein all of the data used in connection with servicing the second database request is obtained from the data stored in the database within the storage device, and wherein the first database manager processes the unprocessed data received from the I/O component of the storage device independently of data external to the storage device to obtain the particular data requested by the database application.

2. The method, according to claim 1, wherein the first database manager runs using the Linux operating system.

3. The method, according to claim 1, further comprising: providing the host having the database application running thereon.

4. The method, according to claim 1, further comprising: providing a second database manager on the host, wherein the second database manager communicates with the first database manager to provide the first database request.

5. The method, according to claim 1, wherein the first database manager is a relational database manager.

6. The method, according to claim 1, further comprising: providing a second database manager that communicates with the first database manager to provide the first database request, wherein the second database manager is external to the storage device.

7. The method, according to claim 6, wherein the first database manager communicates with the second database manager using the DRDA protocol.

8. The method, according to claim 1, wherein shared memory of the storage device is used to obtain data internally.

9. The method, according to claim 8, wherein the shared memory includes a plurality of queues that are used to obtain data internally.

10. The method, according to claim 9, wherein at least one of the queues is implemented using an array.

11. At least one non-transitory computer-readable medium storing computer software that handles database requests for data stored on a storage device, the computer software comprising:
executable code for a database application that requires use of data stored in a database within a storage device, wherein the database application generates a first database request to access particular data stored in the database within the storage device, wherein the database application is executed on a host that is external to the storage device;
executable code that provides a first database manager within the storage device;
executable code of the first database manager that receives the first database request;
executable code of the first database manager that generates a second database request based on the first database request and transmits the second database request to an input/output (I/O) component of the storage device that controls I/O of data to and from the storage device;
executable code of the I/O component that services the second database request by obtaining unprocessed data from the database within the storage device and transmits the unprocessed data to the first database manager; and
executable code of the first database manager that services the first database request by processing the unprocessed data obtained from the I/O component to provide a result thereof that includes the particular data requested by the database application, wherein the particular data contains less data than the unprocessed data received by the first database manager from the I/O component, wherein all of the data used in connection with servicing the second database request is obtained from the data stored in the database within the storage device, and wherein first database manager processes the unprocessed data received from the I/O component of the storage device independently of data external to the storage device to obtain the particular data request by the database application.

12. The at least one non-transitory computer readable medium, according to claim 11, wherein the executable code runs using the Linux operating system.

13. The at least one non-transitory computer readable medium, according to claim 11, wherein the first database manager is a relational database manager.

14. The at least one non-transitory computer readable medium, according to claim 11, wherein shared memory of the storage device is used to obtain data internally.

15. The at least one non-transitory computer readable medium, according to claim 14, wherein the shared memory includes a plurality of queues that are used to obtain data internally.

16. A storage device system, comprising:
a plurality of directors that handle receiving and sending data for a storage device; and
at least one processor system, in communication with at least one of the directors, wherein the at least one processor system includes at least one non-transitory computer-readable medium storing software that handles database requests for data stored on the storage device, the software including:
executable code for a database application that requires use of data stored in a database within a storage device, wherein the database application generates a first database request to access particular data stored in the database within the storage device, wherein the database application is executed on a host that is external to the storage device;
executable code that provides a first database manager within the storage device;
executable code of the first database manager that receives the first database request;
executable code of the first database manager that generates a second database request based on the first database request and transmits the second database request to an input/output (I/O) component of the storage device that controls I/O of data to and from the storage device;
executable code of the I/O component that services the second database request by obtaining unprocessed data from the database within the storage device and transmits the unprocessed data to the first database manager; and
executable code of the first database manager that services the first database request by processing the unprocessed data obtained from the I/O component to provide a result thereof that includes the particular data requested by the database application, wherein the particular data contains less data than the unprocessed data received by the first database manager from the I/O component, wherein all of the data used in connection with servicing the second database request is obtained from the data stored in the database within the storage device, and wherein first database manager processes the unprocessed data received from the I/O component of the storage device independently of data external to the storage device to obtain the particular data request by the database application.

17. The storage device system, according to claim 16, wherein the executable code that services the database request is a relational database manager.

18. The storage device system, according to claim 16, further comprising:

shared memory that is used to obtain data internally.

19. The storage device system, according to claim 18, wherein the shared memory includes a plurality of queues that are used to obtain data internally.

* * * * *